(12) United States Patent
Liu et al.

(10) Patent No.: US 11,007,712 B2
(45) Date of Patent: May 18, 2021

(54) THREE-DIMENSIONAL (3D) PRINTING WITH EPOXY RESIN

(71) Applicant: Hewlett-Packard Development Company, L.P., Houston, TX (US)

(72) Inventors: Qin Liu, Corvallis, OR (US); Chien-Hua Chen, Corvallis, OR (US); Michael G. Monroe, Corvallis, OR (US); Bruce Cowger, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 267 days.

(21) Appl. No.: 16/073,115

(22) PCT Filed: Apr. 20, 2016

(86) PCT No.: PCT/US2016/028519
§ 371 (c)(1),
(2) Date: Jul. 26, 2018

(87) PCT Pub. No.: WO2017/184135
PCT Pub. Date: Oct. 26, 2017

(65) Prior Publication Data
US 2019/0039293 A1    Feb. 7, 2019

(51) Int. Cl.
*B29C 64/165* (2017.01)
*B33Y 10/00* (2015.01)
*B33Y 70/00* (2020.01)
*B29K 105/00* (2006.01)
(Continued)

(52) U.S. Cl.
CPC .......... *B29C 64/165* (2017.08); *B33Y 10/00* (2014.12); *B33Y 70/00* (2014.12); *B29C 64/112* (2017.08); *B29K 2063/00* (2013.01); *B29K 2105/251* (2013.01)

(58) Field of Classification Search
CPC .......................... B29C 64/165; B33Y 10/11
See application file for complete search history.

(56) References Cited

U.S. PATENT DOCUMENTS

| 7,569,273 | B2 | 8/2009 | Bredt et al. |
| 9,156,999 | B2 | 10/2015 | Ng et al. |
| 2005/0179167 | A1 | 8/2005 | Hachikian |

(Continued)

FOREIGN PATENT DOCUMENTS

| CN | 103205107 | 7/2013 |
| CN | 103756293 | 4/2014 |

(Continued)

*Primary Examiner* — Nathan T Leong
(74) *Attorney, Agent, or Firm* — Dierker & Kavanaugh PC

(57) ABSTRACT

In a three-dimensional printing method example, a build material, including an epoxy resin powder, is applied. A hardener liquid is selectively applied on at least a portion of the build material. The portion of the build material in contact with the hardener liquid is allowed to cure to form a layer of a 3D part. In another three-dimensional printing method example, a filler build material is applied. A liquid epoxy resin is selectively applied on at least a portion of the filler. A hardener liquid is selectively applied on the at least the portion of the filler. The portion of the filler in contact with the liquid epoxy resin and the hardener liquid is allowed to cure to form a layer of a 3D part.

19 Claims, 3 Drawing Sheets

(51) Int. Cl.
*B29C 64/112* (2017.01)
*B29K 63/00* (2006.01)

(56) References Cited

U.S. PATENT DOCUMENTS

2012/0251829 A1* 10/2012 Xu .......................... G03F 7/029
                                                                                    428/414
2014/0131908 A1    5/2014 Sun et al.

FOREIGN PATENT DOCUMENTS

| | | |
|---|---|---|
| CN | 104250422 | 12/2014 |
| EP | 1498277 | 1/2005 |
| JP | 2002198657 | 7/2002 |
| WO | WO-2007114895 A2 | 10/2007 |

* cited by examiner

THREE-DIMENSIONAL (3D) PRINTING WITH EPOXY RESIN

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
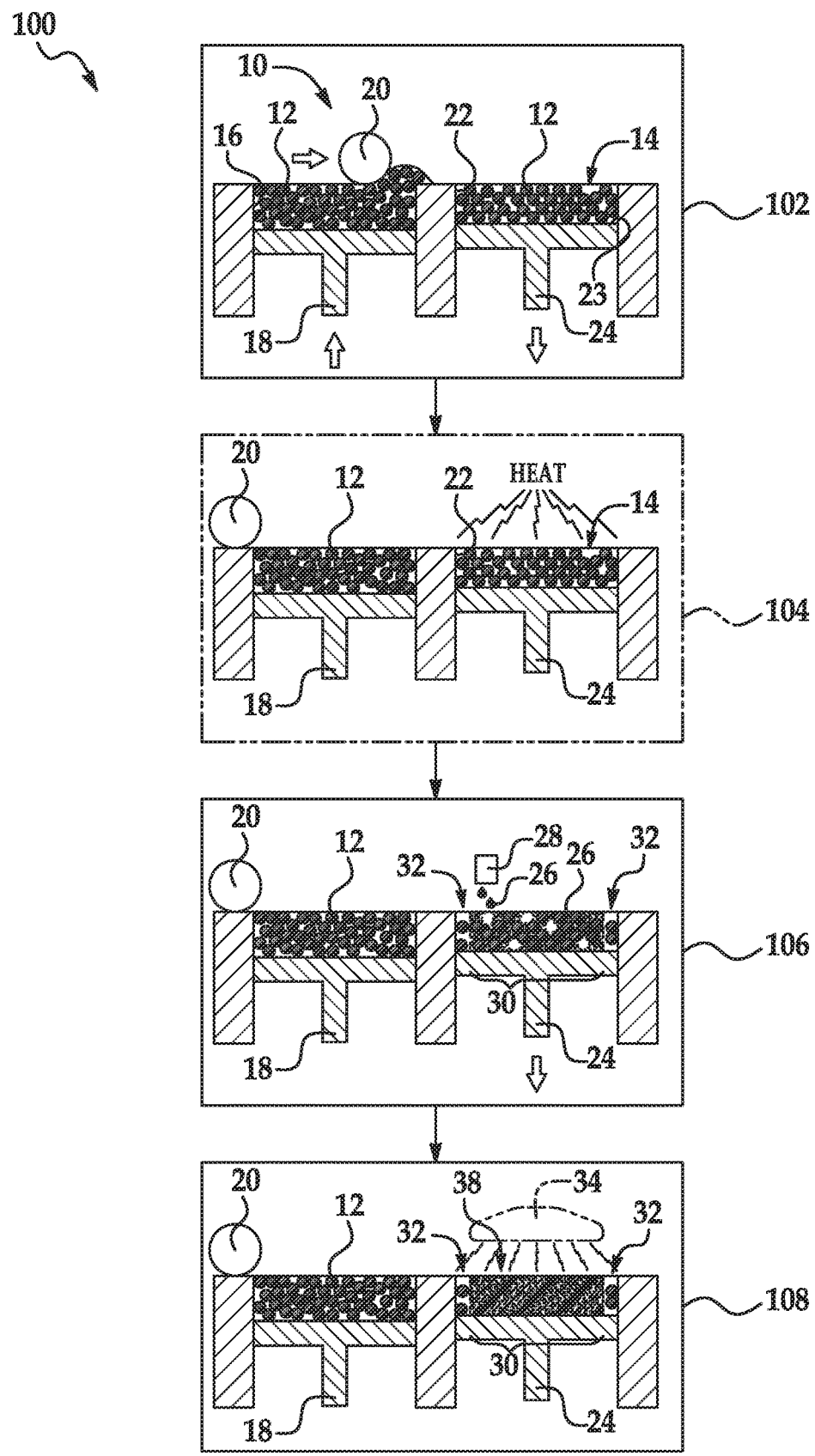
FIG. 1 is a flow diagram illustrating examples of a 3D printing method disclosed herein.

Examples of the three-dimensional (3D) printing method and the 3D printing system disclosed herein utilize an epoxy build material in combination with a hardener liquid or a filler build material in combination with both a liquid epoxy resin and a hardener liquid. Selected region(s) (in some instances less than the entire build material layer) of the epoxy build material or filler build material is/are exposed to the hardener liquid or the liquid epoxy resin and the hardener liquid, and is/are cured and hardened to become a layer of a 3D part. In some of the examples disclosed herein, the hardener liquid is selectively deposited in contact with the selected region of the epoxy build material, and energy may or may not be used to cure the selected region. In some other examples, the hardener liquid and the epoxy resin liquid are selectively deposited in contact with the selected region of the filler build material, and energy may or may not be used to cure the selected region. The hardener liquid and/or the epoxy resin liquid are capable of penetrating into the layer of the epoxy build material or filler build material and spreading onto the exterior surface of the epoxy build material or filler build material. In both sets of examples disclosed herein, the setting/curing/fusing of the epoxy build material or the epoxy resin liquid and filler forms the layer of the 3D part.

Epoxy composites can be used in applications in which extremely low shrinkage, good dimensional stability, good chemical and heat resistance, toughness, and stiffness are required. Epoxy composites can withstand high temperatures and harsh operating environment (e.g., automotive applications). Traditionally, to form a part from an epoxy composite, a mold of the part is made. Making molds can be time consuming and expensive.

Examples of the 3D printing method and 3D printing system disclosed herein utilize an epoxy resin. The epoxy resin may be a powder that is all or part of the build material or the epoxy resin may be dissolved in a solvent and jetted onto a powder filler. This use of epoxy resin in the build material or in a liquid that is jetted on the filler allows for the creation of 3D parts that are tough and stiff, and that have low shrinkage, good dimensional stability, and good chemical and heat resistance. Additionally, the properties (e.g., mechanical, thermal, electrical, and chemical resistance) of the printed part can be tailored by the selection of the epoxy resin, the curing agent, the filler, and the loadings of those components. For example, a higher amount of silica filler can result in a part with a lower coefficient of thermal expansion. For another example, alumina filler may be used to improve the thermal conductance of the epoxy resin (e.g., when compared to an epoxy resin containing silica). For still another example, the epoxy resin may include a silicon flexibilizer to render the resin more elastic. Moreover, the higher the functionalities of the epoxy resin and/or the hardener, the more crosslinked the resulting 3D part will be. More crosslinking results in a higher modulus and a lower elongation.

The epoxy resin powder or epoxy resin liquid is used in combination with a hardener liquid. As used herein, the hardener liquid may be any component(s) that interact with the epoxy resin (either at room temperature or upon exposure to energy), causing the epoxy resin to set/cure/fuse. In the examples disclosed herein, the hardener liquid may be inkjettable.

As used herein, the terms "3D printed part," "3D part," or "part" may be a completed 3D printed part or a layer of a 3D printed part.

Figure 2:
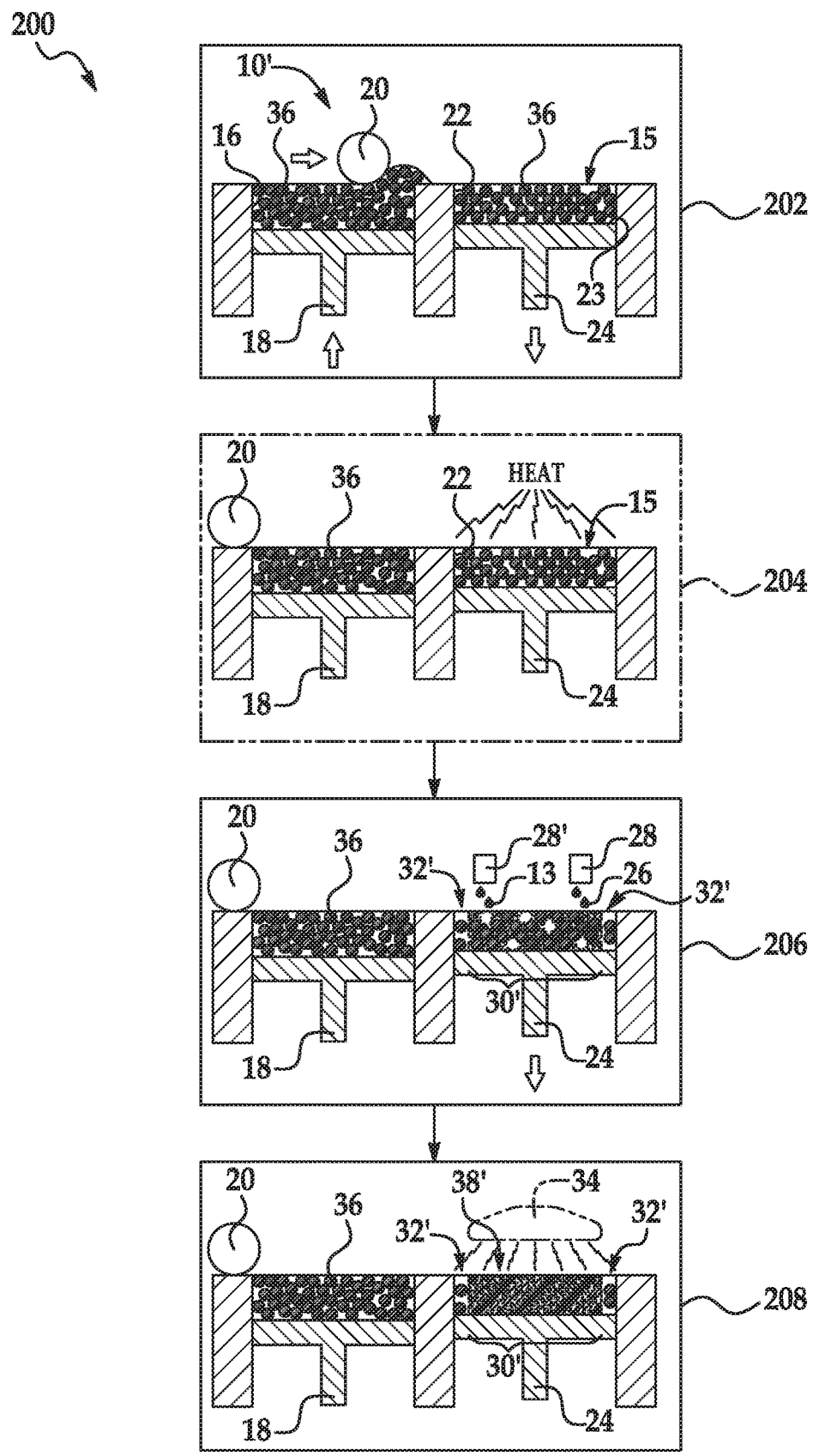
FIG. 2 is a flow diagram illustrating examples of a 3D printing method disclosed herein.

An example of the 3D printing method 100 is depicted in FIG. 1, and another example of the 3D printing method 200 is depicted in FIG. 2. It is to be understood that the method 100 shown in FIG. 1 will be discussed in detail herein, and in some instances, the method 200 shown in FIG. 2 will be discussed in conjunction with FIG. 1. Both the methods 100 and 200 may be used to create a 3D part 38, 38' that is tough and stiff, and that has low shrinkage, good dimensional stability, and good chemical and heat resistance.

As shown at reference numeral 102 of FIG. 1, the method 100 includes applying a build material 12. One layer 14 of the build material 12 has been applied. As shown at reference numeral 202 of FIG. 2, the method 200 includes applying a filler build material 36. One layer 15 of the filler build material 36 has been applied.

The build material 12 includes an epoxy resin powder. In some instances, the epoxy resin powder is capable of setting/curing/fusing at room temperature (e.g., from about 18° C. to about 20° C.) when the hardener liquid 26 is applied. In other instances, the epoxy resin powder is capable of setting/curing/fusing when both a hardener liquid 26 and energy are applied. Examples of the epoxy resin powder include a bisphenol-A epoxy resin (e.g., diglycidyl ethers of bisphenol A (DGEBA)), a bisphenol-F epoxy resin (e.g., diglycidyl ethers of bisphenol F (DGEBF)), a novolac epoxy resin (e.g., phenolic or cresol novolacs), an aliphatic epoxy resin (e.g., cycloaliphatic epoxides), and glycidylamine epoxy resin.

In an example, the build material 12 includes the epoxy resin powder alone. In another example, the build material 12 may include a filler in addition to the epoxy resin powder. In some examples, the build material 12 consists of these components with no other components. In other examples, the build material 12 may also include flow aids, a mold release agent, a colorant, a flame retardant, an adhesion promoter, a stress reliever, or combinations thereof.

When the build material 12 is a mixture of the epoxy resin powder and the filler, the mixture may have a ratio of epoxy resin powder to filler ranging from about 90:10 (9:1) to about 10:90 (1:9). In one example, the ratio of epoxy resin powder to filler is 75:25 (3:1). In another example the ratio is 50:50 (1:1). In still another example the ratio is 20:80 (1:4).

The filler may be a polymer powder, a ceramic powder, a metal powder, or a carbon black powder.

Any polymeric filler may be used that does not melt when the epoxy resin powder is cured. Examples of suitable polymeric fillers include semi-crystalline thermoplastic materials. Some specific examples of the polymeric filler include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the polymeric fillers include polyethylene or copolymers thereof, polyethylene terephthalate (PET), and any available amorphous variations of these materials. Still other examples of suitable polymeric fillers include polystyrene copolymers, polyacetals, polypropylene, polycarbonate, polyester, thermal plastic polyurethanes, other engineering plastics, and blends of any two or more of the polymers listed herein. Core shell polymer particles of these materials may also be used.

Examples of ceramic fillers include metal oxides, inorganic glasses, carbides, nitrides, borides, or combinations thereof. Some specific examples include alumina ($Al_2O_3$), $Na_2O/CaO/SiO_2$ glass (soda-lime glass), silicon carbide (SiC), silicon nitride ($Si_3N_4$), silicon dioxide ($SiO_2$), zirconia ($ZrO_2$), titanium dioxide ($TiO_2$), iron oxide ($Fe_3O_4$), hafnia ($HfO_2$), barium titanate ($BaTiO_3$), tungsten carbide (WC), lead zirconate titanate (PZT), Hydroxyapatite, or combinations thereof. As an example of one suitable combination, 30 wt % glass may be mixed with 70 wt % alumina.

Examples of metallic fillers include bronze, steels, stainless steel, titanium (Ti) and alloys thereof, nickel cobalt (NiCo) alloys, gold (Au) and alloys thereof, silver (Ag) and alloys thereof, and copper (Cu) and alloys thereof. Some specific examples include AlSi10Mg, CoCr MP1, CoCr SP2, MaragingSteel MS1, NickelAlloy HX, Inconel IN625, Inconel IN718, SS GP1, SS PH1, SS 316L, Ti6Al4V, and Ti-6Al-4V ELI7.

Flow aid(s) may be added to improve the coating flowability of the build material 12. Flow aid(s) may be particularly beneficial when the build material 12 particles are less than 25 μm in size. The flow aid improves the flowability of the build material 12 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the build material 12.

The build material 12 may also include a mold release agent. The mold release agent may be included to facilitate the release of the build material 12 and the resulting part from the processing equipment (e.g., the fabrication bed 22). Examples of the mold release agent include waxes (e.g., hydrocarbon waxes), silicones, sodium dodecyl sulfate (SDS) soap, and fatty acids. The mold release agent may be present in the build material 12 in an amount ranging from about 0 wt % to about 1 wt % of the total wt % of the build material 12.

The build material 12 may also include a flame retardant. The flame retardant may reduce or prevent flammability and improve the 3D printer part's shelf life. Examples of suitable flame retardants include halogens (such as bromine), $Sb_2O_3$, metal hydroxides, etc. The amount of the flame retardant present in the build material 12 may range from about 1 wt % to about 15 wt % based on the total wt % of the build material 12.

The build material 12 may also include an adhesion promoter. The adhesion promoter may promote the adhesion of the epoxy resin powder with the filler and other build material components. Examples of adhesion promoters include silane coupling agents. The amount of the adhesion promoter present in the build material 12 may range from about 0 wt % to about 2 wt % based on the total wt % of the build material 12.

The build material 12 may also include a stress reliever. The stress reliever may be used to reduce the amount of stress, such as thermal stress or thermomechanical shrinkage stress, in the 3D printed part 38. Examples of suitable stress relievers include silicone, acrylonitrile-butadiene rubbers, and polybutylacrylate. The amount of the stress reliever present in the build material 12 may range from about 0 wt % to about 10 wt % based on the total wt % of the build material 12.

While not shown in FIG. 1, the method 100 may further include preparing the build material 12.

In one example of preparing the build material 12, the build material 12 may be prepared by grinding the epoxy resin. Any suitable grinding machine may be used, such as a mill or food processor. Grinding may be performed in liquid nitrogen, to ensure that the epoxy resin stays cool and brittle. The ground epoxy resin may then be sorted by size, in order to obtain the epoxy resin powder that is suitable for use as the build material 12. In an example, the ground epoxy resin may be sieved using a filter that is suitably sized to sort out particles that are suitably sized for the 3D printing process disclosed herein. The filter may be any suitable μm sized filter. In one example, the filter is a 75 μm sized filter. In another example, the filter is a stainless steel μm sized filter. In still another example, a double filter system is used to select/sort out particles of the ground epoxy resin having a particle size ranging from about 75 μm to about 20 μm for the 3D printing application.

In another example of preparing the build material 12, the mixture of the epoxy resin powder and the filler may be mixed together in the desirable ratio (with or without other additives) to form the build material 12 before the 3D printing method 100 is initiated.

As mentioned above and as shown at reference numeral 202, the method 200 includes applying a filler build material 36. As depicted at reference numeral 202, one layer 15 of the filler build material 36 has been applied. In some examples, the filler build material 36 is used alone, and in other examples, the filler build material 36 is used in combination with the previously mentioned flow aid(s).

The filler build material 36 may be a polymer powder, a ceramic powder, a metal powder, or a carbon black powder. Examples of the polymer fillers, ceramic fillers, and metal fillers are listed above in reference to the build material 12. These same fillers may be used for the filler build material 36 in the method 200.

The build material 12 (i.e., epoxy resin powder or a mixture of the epoxy resin powder and the filler, with or without other additives) or the filler build material 36 (with or without flow aid(s)) may be made up of similarly sized particles or differently sized particles. In the examples shown herein, the build material 12 and the filler build material 36 include similarly sized particles. The term "size", as used herein with regard to the build material 12 and the filler build material 36, refers to the diameter of a substantially spherical particle (i.e., a spherical or near-spherical particle having a sphericity of >0.84), or the average diameter of a non-spherical particle (i.e., the average of multiple diameters across the particle). The average particle size of the particles of the build material 12 and the average particle size of the particles of filler build material 36 may be greater than 1 μm and may be up to about 500 μm. Substantially spherical particles of this particle size have good flowability and can be spread relatively easily. As another example, the average size of the particles of the build material 12 and the average particle size of the particles of filler 36 range from about 10 μm to about 200 μm. As still another example, the average size of the particles of the build material 12 and the average particle size of the particles of filler 36 range from 20 μm to about 60 μm.

In the example shown at reference numeral 102 in FIG. 1, applying the build material 12 includes the use of the printing system 10, and in the example shown at reference numeral 202 in FIG. 2, applying the filler 36 includes the use of the printing system 10'. The printing system 10 may be similar to the printing system 10'. The printing system 10, 10' may include a supply bed 16 (including a supply of the build material 12), a delivery piston 18, a build material/filler distributor or spreader 20 (an example of which is the roller shown in FIG. 1), a fabrication bed 22 (having a contact surface 23), and a fabrication piston 24. Each of these physical elements may be operatively connected to a central processing unit (not shown) of the printing system 10, 10'. The central processing unit (e.g., running computer readable instructions stored on a non-transitory, tangible computer readable storage medium) manipulates and transforms data represented as physical (electronic) quantities within the printer's registers and memories in order to control the physical elements to create the 3D part 38, 38'. The data for the selective delivery of the build material 12, the filler build material 36, the liquid epoxy resin 13, the hardener liquid 26, etc. may be derived from a model of the 3D part 38, 38' to be formed. For example, the instructions may cause the controller to utilize a build material/filler distributor to dispense the build material 12 or filler 36. In another example, the instructions may cause the controller to utilize an applicator to dispense the liquid epoxy resin 13 or the hardener liquid 26.

The delivery piston 18 and the fabrication piston 24 may be the same type of piston, but are programmed to move in opposite directions. In an example, when a layer of the 3D part 38, 38' is to be formed, the delivery piston 18 may be programmed to push a predetermined amount of the build material 12 or filler 36 out of the opening in the supply bed 16 and the fabrication piston 24 may be programmed to move in the opposite direction of the delivery piston 18 in order to increase the depth of the fabrication bed 22. The delivery piston 18 will advance enough so that when the spreader 20 pushes the build material 12 or filler 36 into the fabrication bed 22 and onto the contact surface 23, the depth of the fabrication bed 22 is sufficient so that a layer 14 of the build material 12 or a layer 15 of the filler 36 may be formed in the fabrication bed 22. The spreader 20 is capable of spreading the build material 12 or filler 36 into the fabrication bed 22 to form a layer (the build material layer 14 or the filler layer 15), which is relatively uniform in thickness. In an example, the thickness of the build material layer 14 or the filler layer 15 ranges from about 30 μm to about 70 μm, although thinner or thicker layers may also be used. For example, the thickness of the layer 14, 15 may range from about 50 μm to about 1000 μm. Depending upon the desired thickness for the layer 14 and the particle size of the build material 12, the layer 14 that is formed in a single build material application may be made up of a single row of build material particles 12 or several rows of build material particles 12 (as shown at reference numeral 102). Similarly, depending upon the desired thickness for the layer 15 and the particle size of the filler 36, the layer 15 that is formed in a single filler application may be made up of a single row of filler particles 36 or several rows of filler particles 36 (as shown at reference numeral 202).

The spreader 20 shown is a roller. It is to be understood that the spreader 20 may be replaced by other tools, such as a rigid or flexible blade that may be useful for spreading different types of powders, or a combination of a roller and a blade. The build material 12 or the filler 36 may also be sprayed, squeegeed, extruded, or otherwise dispensed onto the fabrication bed 22 or other support member. In an example, the build material 12 or filler build material 36 may be sprayed using an extrusion coater.

The supply bed 16 that is shown is one example, and could be replaced with another suitable delivery system to supply the build material 12 or the filler 36 to the fabrication bed 22. Examples of other suitable delivery systems include a hopper, an auger conveyer, or the like.

The fabrication bed 22 that is shown is also one example, and could be replaced with another support member, such as a platen, a print bed, a glass plate, or another build surface. Like the fabrication bed 22 and the fabrication piston 24, these other support members may be lowered in precise increments in order to receive the build material 12 or the filler build material 36 in a desirable thickness.

As shown at reference numerals 104 (FIG. 1) and 204 (FIG. 2), the layer 14 of the build material 12 or the layer 15 of filler build material 36 may be exposed to pre-heating after the layer 14, 15 is applied in the fabrication bed 22 (and prior to selectively applying the hardener liquid 26 or the liquid epoxy resin 13 and the hardener liquid 26). Pre-heating may be used for an epoxy system that is ultimately cured with energy exposure. Pre-heating may be performed to pre-heat the build material 12 or the filler build material 36, and thus may reduce the time it takes the build material 12 or the liquid epoxy resin 13 to set/cure/fuse when subsequently exposed to energy. The pre-heating temperature may be below the temperature at which the build material 12 will flow or at which the filler 36 will melt or flow. As such, the pre-heating temperature selected will depend upon the build material 12 or filler build material 36 that is used. As examples, the pre-heating temperature may be from about 5° C. to about 50° C. below the flow point of the epoxy resin powder of the build material 12 or from about 5° C. to about 50° C. below the melting point or flow point of the filler build material 36.

Pre-heating the layer 14 of the build material 12 or the layer 15 of the filler build material 36 may be accomplished using any suitable heat source that exposes all of the build material 12 or all of the filler build material 36 in the fabrication bed 22 to the heat. Examples of the heat source include a thermal heat source (e.g., a heater (not shown) of the fabrication bed 22) or an electromagnetic radiation source (e.g., infrared (IR), microwave, etc.). In an example, pre-heating the build material 12 or the filler build material 36 may be accomplished using a combination of conductive heat from heaters built into the fabrication bed 22 (or other support member 40, shown in FIG. 3), as well as radiation (e.g., IR radiation) from the energy source 34. Heating of the build material 12 or the filler build material 36 could also be done convectively with hot air.

In the method 100 (FIG. 1), after the build material 12 is applied at reference numeral 102 and/or after the build material 12 is pre-heated at reference numeral 104, the hardener liquid 26 is selectively applied on at least a portion 30 of the build material 12, in the layer 14, as shown at reference number 106. This will be discussed in more detail below.

In the method 200 (FIG. 2), after the filler build material 36 is applied at reference numeral 202 and/or the filler build material 36 is pre-heated at reference numeral 204, the liquid epoxy resin 13 is selectively applied on at least a portion 30' of the filler build material 36.

The liquid epoxy resin 13 is capable of setting/curing/fusing upon the application of the hardener liquid 26, or upon the application of the hardener liquid 26 and energy. The liquid epoxy resin 13 is also able to penetrate, at least partially, into the layer 15 of the filler build material 36.

The liquid epoxy resin 13 may include an epoxy resin and a solvent. In some examples, the liquid epoxy resin 13 consists of these components with no other components. In other examples, the liquid epoxy resin 13 includes a co-solvent, an anti-kogation agent, or combinations thereof.

The epoxy resin may be any suitable material that is capable of setting/curing/fusing when the hardener liquid 26 is applied, or when the hardener liquid 26 and energy are applied. Examples of the epoxy resin include bisphenol-A epoxy resin (i.e., diglycidyl ether of bisphenol A (DGEBA)), bisphenol-F epoxy resin (i.e., diglycidyl ether of bisphenol F (DGEBF)), novolac epoxy resins (e.g., phenolic or cresol novolacs), aliphatic epoxy resin (e.g., cycloaliphatic epoxides), and glycidylamine epoxy resin. Mixtures of epoxy resins may also be included in the liquid epoxy resin 13.

The amount of the epoxy resin that is present in the liquid epoxy resin 13 ranges from greater than 0 wt % to about 60 wt % based on the total wt % of the liquid epoxy resin 13. The amount of the epoxy resin may vary, depending upon the molecular weight of the epoxy resin. For example a lower molecular weight epoxy resin may be present in a higher amount. As other examples, the amount of the epoxy resin in the liquid epoxy resin 13 ranges from about 0.3 wt % to 30 wt %, or from about 1 wt % to about 20 wt %. It is believed that these epoxy resin loadings provide a balance between the liquid epoxy resin 13 having jetting reliability and setting/curing/fusing efficiency.

The solvent may be any solvent that is capable of dissolving or dispersing the epoxy resin, rendering it inkjet printable, without interfering with the epoxy resin's ability to set/cure/fuse. The solvent generally lowers the viscosity of the epoxy resin, and renders the liquid epoxy resin 13 capable of wetting the filler build material 36. The solvent may also be selected based on its jettability and evaporating rate. Examples of the solvent include ketones, esters, acetates, and sulfoxides. An example of a suitable ketone is acetone. An example of a suitable acetate includes ethyl acetate. An example of a suitable sulfoxide is dimethyl sulfoxide (DMSO). An example of a suitable ester includes γ-butyrolactone. Any of the listed solvents may be used in combination as co-solvents. The solvent(s) may make up a balance of the liquid epoxy resin 13.

When the liquid epoxy resin 13 is to be applied via thermal inkjet applications, an anti-kogation agent may also be included. Kogation refers to the deposit of dried ink or liquid epoxy resin 13 on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the liquid epoxy resin 13 in an amount ranging from about 0.1 wt % to about 1 wt % of the total wt % of the liquid epoxy resin 13.

The liquid epoxy resin 13 may be dispensed on the filler build material 36 in an amount such that the ratio of the epoxy resin to the filler build material 36 ranges from about 90:10 (9:1) to about 10:90 (1:9). In one example, the ratio of the epoxy resin to the filler 36 is 75:25 (3:1). In another example the ratio is 50:50 (1:1). In still another example the ratio is 20:80 (1:4). It is to be understood that these ratios are of the epoxy resin to the filler 36 and do not account for the amount of solvent(s) or other component(s) in the liquid epoxy resin 13.

The liquid epoxy resin 13 may be dispensed from any suitable applicator. As illustrated in FIG. 2 at reference numeral 206, the liquid epoxy resin 13 may be dispensed from an inkjet printhead 28', such as a thermal inkjet printhead or a piezoelectric inkjet printhead. The printhead 28' may be a drop-on-demand printhead or a continuous drop printhead. The applicator 28' selectively applies the liquid epoxy resin 13 on those portions 30' of the filler build material 36 from which the 3D part 38' is to be formed. As such, the liquid epoxy resin 13 may be applied on all of the filler build material 36, if all of the filler build material 36 is to form the 3D part 38'. In the example shown in FIG. 2, the liquid epoxy resin 13 is not applied on the portions 32'. As such, the filler build material 36 in those portions 32' does not set/cure/fuse to become the 3D part 38'.

The applicator 28' may be selected to deliver drops of the liquid epoxy resin 13 at a resolution ranging from about 300 dots per inch (DPI) to about 1200 DPI. In other examples, the applicator 28' may be selected to be able to deliver drops of the liquid epoxy resin 13 at a higher or lower resolution. The drop velocity may range from about 5 m/s to about 24 m/s and the firing frequency may range from about 1 kHz to about 100 kHz. The applicator 28' may include an array of nozzles through which it is able to selectively eject drops of fluid. In one example, each drop may be in the order of about 10 pico liters (pl) per drop, although it is contemplated that a higher or lower drop size may be used. In some examples, applicator 28' is able to deliver variable size drops of the liquid epoxy resin 13.

The applicator 28' may be attached to a moving XY stage or a translational carriage (neither of which is shown) that moves the applicator 28' adjacent to the contact surface 23 of the fabrication bed 22 in order to deposit the liquid epoxy resin 13 in desirable area(s) 30'. In other examples, the applicator 28' may be fixed while a support member (supporting the build surface) is configured to move relative thereto.

In an example, the applicator 28' may have a length that enables it to span the whole width of the fabrication bed 22 in a page-wide array configuration. As used herein, the term 'width' generally denotes the shortest dimension in the plane parallel to the X and Y axes of the fabrication bed 22, and the term 'length' denotes the longest dimension in this plane. However, it is to be understood that in other examples the term 'width' may be interchangeable with the term 'length'. In an example, the page-wide array configuration is achieved through a suitable arrangement of multiple applicators 28'. In another example, the page-wide array configuration is achieved through a single applicator 28'. In this other example, the single applicator 28' may include an array of nozzles having a length to enable them to span the width of the fabrication bed 22. This configuration may be desirable for single pass printing. In still other examples, the applicator(s) 28' may have a shorter length that does not enable them to span the whole width of the fabrication bed 22. In these other examples, the applicator(s) 28' may be movable bi-directionally across the width of the fabrication bed 22. This configuration enables selective delivery of the liquid epoxy resin 13 across the whole width and length of the fabrication bed 22 using multiple passes.

The applicator(s) 28' may be programmed to receive commands from a central processing unit and to deposit the liquid epoxy resin 13 according to a pattern of a cross-section for the layer of the 3D part 38' that is to be formed. As used herein, the cross-section of the layer of the part 38' to be formed refers to the cross-section that is parallel to the contact surface 23. In the example shown in FIG. 2 at reference numeral 206, the applicator 28' selectively applies the liquid epoxy resin 13 on those portion(s) 30' of the layer 15 that are to be set/cured/fused to become the first layer of the 3D part 38'. As an example, if the first layer is to be shaped like a cube or cylinder, the liquid epoxy resin 13 will be deposited in a square pattern or a circular pattern (from a top view), respectively, on at least a portion of the layer 15 of the filler 36. In the example shown in FIG. 2 at reference numeral 206, the liquid epoxy resin 13 is deposited in a square pattern on the portion 30' of the layer 15 and not on the portions 32'.

It is to be understood that a single liquid epoxy resin 13 (including one epoxy resin or a mixture of epoxy resins) may be selectively applied to form the layer of the 3D part 38', or multiple liquid epoxy resins 13 (each of which may include a different epoxy resin) may be selectively applied to form the layer of the 3D part 38'.

As mentioned above, in the method 100 (FIG. 1), after the build material 12 is applied at reference numeral 102 and/or after the build material 12 is pre-heated at reference numeral 104, the hardener liquid 26 is selectively applied on at least a portion 30 of the build material 12, in the layer 14, as shown at reference number 106.

In the method 200 (FIG. 2), after the liquid epoxy resin 13 is selectively applied on at least the portion 30' of the filler build material 36, the hardener liquid 26 is selectively applied on the at least the portion 30' of the build material filler 36, in the layer 15, as shown at reference number 206.

In the example method 100, the hardener liquid 26 is capable of causing the build material 12 in contact with it to set/cure/fuse either with time (e.g., when the epoxy resin in the build material 12 is capable of curing at room temperature) or upon exposure to energy. The hardener liquid 26 is also able to penetrate, at least partially, into the layer 14 of the build material 12. In the example method 200, the hardener liquid 26 is capable of causing the epoxy resin in the liquid 13 in contact with the hardener liquid 26 to set/cure/fuse either with time (e.g., when the epoxy resin in the liquid 13 is capable of curing at room temperature) or upon exposure to energy. The hardener liquid 26 is also able to penetrate, at least partially, into the layer 15 of the filler build material 36 having the liquid epoxy resin 13 already applied thereto.

In either example of the method 100 or 200, the hardener liquid 26 may include a curing agent and a solvent. In some examples, the hardener liquid 26 consists of these components with no other components. The hardener liquid 26 may also include co-solvent(s), anti-kogation agent(s), surfactant(s), diluent(s), toughening agent(s), or combinations thereof.

In the method 100, the curing agent may be any suitable material that is capable of causing the build material 12 in contact with the curing agent to set/cure/fuse either with time or upon exposure to energy. In the method 200, the curing agent may be any suitable material that is capable of causing the epoxy resin in the liquid 13 in contact with the curing agent to set/cure/fuse either with time or upon exposure to energy. The curing agent may be capable of nucleophilic or electrophilic curing or free radical curing, either of which may result in cross-linking of the build material 12 or the epoxy resin in the liquid 13. Examples of the curing agent include amines, anhydrides, acids, phenols, alcohols, thiols, and anionic or cationic ring opening initiators. An example of a cationic ring opening initiator is a cationic photoinitiator. Examples of cationic photoinitiators include bis(4-tert-butylphenyl)iodonium triflate, triarylsulfonium hexafluoroantimonate, and bis(4-tert-butylphenyl)iodonium p-toluenesulfonate. Examples of diamine hardeners are propane diamine, hexane diamine, diethylene triamine, triethylene tetramine, 4,4'-diam inodiphenylmethane, 2-methylpentamethylene diamine, 1,2-diaminocyclohexane, 1,3-pentanediamine, and isophoronediamine.

The amount of the curing agent that is present in the hardener liquid 26 ranges from 10 wt % to about 80 wt % based on the total wt % of the hardener liquid 26. In other examples, the amount of the curing agent in the hardener liquid 26 ranges from about 15 wt % to 70 wt %, or from about 20 wt % to about 60 wt %. It is believed that these curing agent loadings provide a balance between the hardener liquid 26 having jetting reliability and a loading relative to the epoxy resin setting/curing/fusing efficiency.

The solvent in the hardener liquid 26 may be any solvent that is capable of dissolving the curing agent, rendering it suitable for inkjet printing, without interfering with the curing agent's ability to cause the build material 12 or the epoxy resin in the liquid 13 to set/cure/fuse. The solvent also renders the hardener liquid 26 capable of wetting the build material 12 or 36. The solvent may also be selected base on its jettability and evaporating rate. The solvent used to dissolve the curing agent may be any of the solvents used to dissolve the epoxy resin in the liquid epoxy resin 13. Any of the listed solvents may be used in combination as co-solvents. The solvent(s) may make up a balance of the hardener liquid 26.

Any of the previously listed anti-kogation agent(s) may be used in the hardener liquid 26. The anti-kogation agent may be present in the hardener liquid 26 in an amount ranging from about 0.1 wt % to about 1 wt % of the total wt % of the hardener liquid 26.

The surfactant(s) may be used so that the hardener liquid 26 quickly wets the build material 12 or 36. As an example, the hardener liquid 26 may include non-ionic, cationic, and/or anionic surfactants, which may be present in an amount ranging from about 0.01 wt % to about 5 wt % based on the total wt % of the hardener liquid 26. In at least some examples, the hardener liquid 26 may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

Examples of diluents that may be included in the hardener liquid 26 include mono epoxides and di-n-butyl phthalate. Examples of toughening agents that may be included in the hardener liquid 26 are functionalized polyesters, polyethers, butadiene-acrylonitrile, polyurethanes, and polysiloxanes. When included, the diluent and the toughening agent may each be included in the hardener liquid 26 in an amount ranging from about 5 wt % to about 55 wt % based on the total wt % of the hardener liquid 26.

The hardener liquid 26 may also include a heat or energy absorber, that will absorb applied heat or radiation (e.g., IR radiation), and help to increase the heating rate of the build material 12 or 36 in the portion(s) where the hardener liquid 26 is applied. The heat or energy absorber may be desirable when the curing agent is curable upon exposure to heat, photo energy, or radiation. One example of an energy absorber is carbon black.

The hardener liquid 26 may be applied using any suitable applicator, such as applicator 28 shown at reference numerals 106 (FIG. 1) and 206 (FIG. 2). The applicator 28 may be any of the applicators described above in relation to the applicator 28' (which is used to apply the liquid epoxy resin 13 at reference numeral 206 in FIG. 2), such as a thermal inkjet printhead or a piezoelectric inkjet printhead. The applicator 28 may also function (e.g., move, receive commands from the central processing unit, etc.) and have the same dimensions (e.g., length and width) as the applicator 28' described above. When the liquid epoxy resin 13 is applied (e.g., in method 200), the liquid epoxy resin 13 and the hardener liquid 26 may be applied in a single pass or sequentially. It may be desirable to deposit the liquid epoxy resin 13 and then the hardener liquid 26.

In the example shown in FIG. 1 at reference numeral 106, the applicator 28 selectively applies the hardener liquid 26 on those portion(s) 30 of the layer 14 that are to be set/cured/fused to become the first layer of the 3D part 38.

In the example shown in FIG. 2 at reference numeral 206, the applicator 28 selectively applies the hardener liquid 26 on those portion(s) 30' of the layer 15 that are to be set/cure/fused to become the first layer of the 3D part 38'. As an example, if the 3D part that is to be formed is to be shaped like a cube or cylinder, the hardener liquid 26 will be deposited in a square pattern or a circular pattern (from a top view) on at least a portion of the layer 14 of the build material 12 or the layer 15 of the filler 36. In the examples shown in FIGS. 1 and 2 at reference numerals 106 and 206, the hardener liquid 26 is deposited in a square pattern on the portion 30, 30' of the layer 14, 15 and not on the portions 32, 32'.

It is to be understood that a single hardener liquid 26 may be selectively applied to form the layer of the 3D part 38, 38', or multiple, different hardener liquids 26 may be selectively applied to form the layer of the 3D part 38, 38'.

In the method 100 (FIG. 1), after the hardener liquid 26 is selectively applied in the desired portion(s) 30, the entire layer 14 of the build material 12 (including the hardener liquid 26 applied to at least a portion thereof) is allowed to cure (as shown at reference numeral 108).

When the epoxy resin in the build material 12 is a room temperature curing epoxy, the build material 12 and hardener liquid 26 may be allowed to cure without any further processing steps. Alternatively, in this example, heat may be used to speed the curing process. In this example, since the jetting of the hardener liquid 26 defines the 3D layer 38 that is formed, the heat may be applied while the hardener liquid 26 is applied in order to increase throughput of the 3D layer 38.

When the epoxy resin in the build material 12 is an epoxy that requires higher temperature, photo-activation, and/or radiation to cure, the build material 12 may be exposed to the appropriate energy, as shown in phantom at reference numeral 108 of FIG. 1.

In the method 200 (FIG. 2), after the liquid epoxy resin 13 and the hardener liquid 26 are selectively applied in the desired portion(s) 30', the entire layer 15 of the filler 36 (including the liquid epoxy resin 13 and the hardener liquid 26 applied to at least a portion thereof) is allowed to cure (as shown at reference numeral 208).

When the epoxy resin in the liquid 13 is a room temperature curing epoxy, the filler build material 36, epoxy resin liquid 13, and hardener liquid 26 may be allowed to cure without any further processing steps. Alternatively, in this example, heat may be used to speed the curing process. In this example, since the jetting of the epoxy resin liquid 13 and hardener liquid 26 defines the 3D layer 38' that is formed, the heat may be applied while the epoxy resin liquid 13 and hardener liquid 26 are applied in order to increase throughput of the 3D layer 38'.

When the epoxy resin in the liquid 13 is an epoxy that requires higher temperature, photo-activation, and/or radiation to cure, the build material 36 (having the epoxy resin liquid 13 and hardener liquid 26 thereon) may be exposed to the appropriate energy, as shown in phantom at reference numeral 208 of FIG. 2.

When used, the appropriate energy (e.g., heat, photo energy, radiation) is emitted from an energy source 34. The energy source 34 may be any source that emits heat, or electromagnetic radiation having a frequency ranging from about 3 GHz to about 30 PHz. Examples of suitable energy sources 34 include a furnace, a conventional oven, a UV, IR or near-IR curing lamp, or UV, IR or near-IR light emitting diodes (LED), lasers with specific UV, IR or near-IR wavelengths, visible light sources, microwave generators, radars, or the like, a microwave or RF furnace, a magnetron that emits microwaves, antenna structures that emit RF energy, etc.

The energy source 34 may be attached, for example, to a carriage that also holds the inkjet applicators 28, 28'. The carriage may move the energy source 34 into a position that is adjacent to the fabrication bed 22. The energy source 34 may also be fixed above the fabrication bed 22. The energy source 34 may also be integrated into the fabrication bed 22 (e.g., in the piston 24).

The energy source 34 may be programmed to receive commands from the central processing unit and to expose the layer 14, including the hardener liquid 26 and build material 12, or to expose the layer 15, including the filler 36, the liquid epoxy resin 13 and the hardener liquid 26, to the energy.

Exposure to energy may cause some or all of the solvent present in the liquid epoxy resin 13 and/or the hardener liquid 26 to evaporate leaving the curing agent on the build material 12 or the epoxy resin and the curing agent on the filler 36. Exposure to energy may also cause the build material 12 or the epoxy resin (from the liquid 13) in contact with the curing agent (from the hardener liquid 26) to set/cure/fuse.

When utilized, the energy exposure time may be dependent on the characteristics of the energy source 34 chosen, the characteristics of the liquid epoxy resin 13 used, the characteristics of the hardener liquid 26 used, and/or the characteristics of the build material 12 used. Additionally, the energy exposure time may be dependent on the ratio of epoxy resin powder to filler in the build material 12 or the ratio of epoxy resin (in the liquid 13) to filler 36.

In an example, the setting/curing/fusing temperature ranges from about 20° C. to about 200° C.

In an example, the setting/curing/fusing time ranges from about 30 seconds to about 60 minutes. In another example, the setting/curing/fusing time ranges from about 5 minutes to about 60 minutes or from about 30 seconds to about 30 minutes. In still another example, the setting/curing/fusing time is about 10 minutes. The setting/curing/fusing time may vary depending upon the epoxy resin system (e.g., resin, hardener liquid, etc.) that is utilized.

In the method 100, the hardener liquid 26 causes the build material 12 in contact therewith (i.e., in the portion(s) 30) to set/cure/fuse with time or upon exposure to energy. A chemical reaction or a series of chemical reactions involving the curing agent in the hardener liquid 26 and the epoxy resin powder in the build material 12 is initiated. The chemical reactions crosslink the epoxy resin powder and result in the setting/curing/fusing of the build material 12 in contact with the hardener liquid 26. In an example, the setting/curing/fusing reactions are initiated by applying the hardener liquid 26 to the epoxy resin powder in the build material 12, or by heating, photo activating, or radiation activating the hardener liquid 26 in contact with the build material 12.

In the method 200, the hardener liquid 26 causes the epoxy resin in the liquid 13 in contact therewith to set/cure/fuse with time or upon exposure to energy. When the epoxy resin sets/cures/fuses, the filler 36 in contact therewith (i.e., in the portion(s) 30') is incorporated into the 3D part 38' that is formed. A chemical reaction or a series of chemical reactions involving the curing agent in the hardener liquid 26 and the epoxy resin in the liquid 13 is initiated. The chemical reactions crosslink the epoxy resin and result in the setting/curing/fusing of the epoxy resin in contact with the hardener liquid 26.

In an example, the setting/curing/fusing reactions between the hardener liquid 26 and the build material 12 or the setting/curing/fusing reactions between the hardener liquid 26 and the liquid epoxy resin 13 are initiated by contacting the materials and allowing them to react at room temperature (e.g., at a temperature ranging from about 18° C. to about 20° C.). In another example, the setting/curing/fusing reactions between the hardener liquid 26 and the build material 12 or the setting/curing/fusing reactions between the hardener liquid 26 and the liquid epoxy resin 13 are initiated by heating the build material 12 or the filler 36 to a temperature ranging from about 20° C. to about 200° C. In yet another example, the setting/curing/fusing reactions are initiated by heating the build material 12 or the filler 36 to a temperature ranging from about 20° C. to about 150° C. In still another example, the setting/curing/fusing reactions are initiated by heating the build material 12 or the filler 36 to about 100° C. It is to be understood that that the temperature at which the setting/curing/fusing reactions are initiated may be dependent on the hardener liquid 26 used, the build material 12 used, and/or the liquid epoxy resin 13 used. Photo energy and/or radiation may also be used to initiate the cross-linking reaction(s).

It is to be understood that portions 32 of the build material 12 that do not have the hardener liquid 26 applied thereto do not participate in the setting/curing/fusing reactions and do not set/cure/fuse. It is also to be understood that portions 32' of the filler 36 that do not have the liquid epoxy resin 13 and the hardener liquid 26 applied thereto do not participate in the setting/curing/fusing reactions and do not set/cure/fuse.

Allowing the materials to cure forms the 3D layer or part 38, 38', as shown at reference numerals 108 in FIGS. 1 and 208 in FIG. 2.

While the 3D part 38, 38' is shown as a single layer, it is to be understood that the 3D part 38, 38' may include several layers. In the example of the 3D printing method 100 shown in FIG. 1, each additional layer of the 3D part 38 may be formed by repeating reference numerals 102-108. For example, to form an additional layer of the 3D part 38, an additional layer of the build material 12 may be applied to the 3D part 38 shown in reference numeral 108 and the additional layer may be preheated, may have the hardener liquid 26 selectively applied thereto, and may be allowed to cure to form that additional layer. Any number of additional layers may be formed. When the 3D part/object 38 is complete, it may be removed from the fabrication bed 22, and any unset/uncured/unfused build material 12 may be removed, and in some instances reused.

In the example of the 3D printing method shown in FIG. 2, each additional layer of the 3D part 38' may be formed by repeating reference numerals 202-208. For example, to form an additional layer of the 3D part 38', an additional layer of the filler 36 may be applied to the 3D part 38' shown in reference numeral 208 and the additional layer may be preheated, may have the liquid epoxy resin 13 selectively applied thereto, may have the hardener liquid 26 selectively applied thereto, and may be allowed to cure to form that additional layer. Any number of additional layers may be formed. When the 3D object/part 38' is complete, it may be removed from the fabrication bed 22, and any unset/uncured/unfused filler 36 may be removed, and in some instances reused.

For epoxy resins that are liquid at ambient temperatures or are difficult to process in powder form, the method 200 may be utilized.

While not shown in FIGS. 1 and 2, the methods 100 and 200 may also include post treatments, such as an additional heating process to ensure curing. Post treatments are generally performed after non-cured build material 12 or filler build material 36 are removed. An example post-treatment temperature may be up to 220° C.

Figure 3:
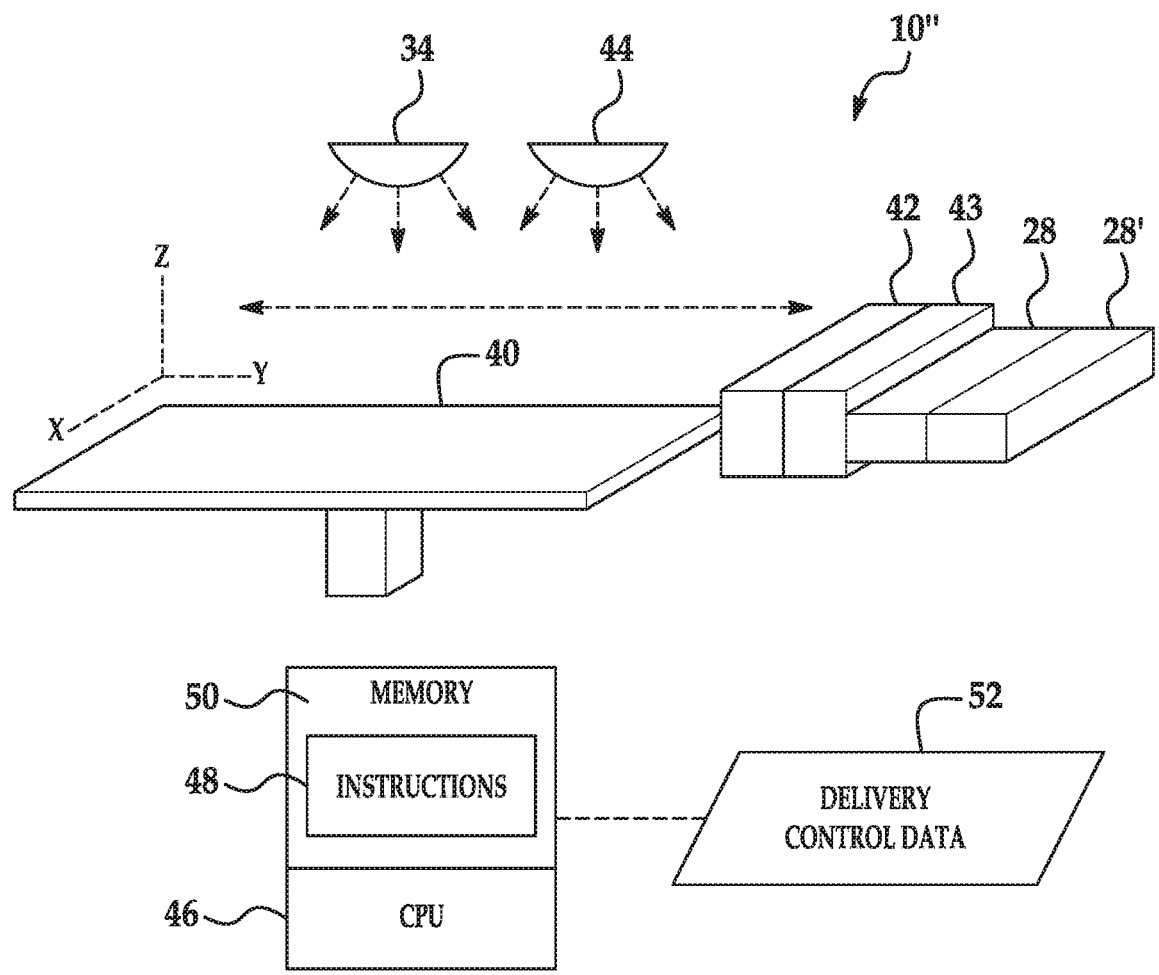
FIG. 3 is a simplified isometric view of an example of a 3D printing system disclosed herein.

Referring now to FIG. 3, another example of the printing system 10" is depicted. The system 10" includes a central processing unit 46 that controls the general operation of the additive printing system 10". As an example, the central processing unit 46 may be a microprocessor-based controller that is coupled to a memory 50, for example via a communications bus (not shown). The memory 50 stores the computer readable instructions 48. The central processing unit 46 may execute the instructions 48, and thus may control operation of the system 10" in accordance with the instructions 48. In one example, the instructions 48 may cause the controller to utilize a build material distributor 42 to dispense the build material 12, and to utilize the hardener liquid distributor 28 (e.g., an inkjet applicator 28) to selectively dispense the hardener liquid 26 to form a three-dimensional part 38. In another example, the instructions 48 may cause the controller to utilize a filler distributor 43 to dispense the filer 36, to utilize the liquid epoxy resin distributor 28' (e.g., an inkjet applicator 28') to selectively dispense the liquid epoxy resin 13, and to utilize the hardener liquid distributor 28 to selectively dispense the hardener liquid 26 to form a three-dimensional part 38'.

In this example, the printing system 10" includes a liquid epoxy resin distributor 28' to selectively deliver the liquid epoxy resin 13 to portion(s) 30' of the layer (not shown in this figure) of filler 36 provided on a support member 40. In this example, the printing system 10" also includes a hardener liquid distributor 28 to selectively deliver the hardener liquid 26 to portion(s) 30 of the layer (not shown in this figure) of the build material 12 or to portion(s) 30' of the filler 36 provided on the support member 40.

The central processing unit 46 controls the selective delivery of the liquid epoxy resin 13 and/or the hardener liquid 26 to the layer of the build material 12 or filler 36 in accordance with delivery control data 52.

In the example shown in FIG. 3, it is to be understood that the distributors 28, 28' are printheads, such as thermal printheads or piezoelectric inkjet printheads. The printheads 28, 28' may be drop-on-demand printheads or a continuous drop printheads.

The applicators 28, 28' may be used to selectively deliver the liquid epoxy resin 13 and the hardener liquid 26, respectively, when in the form of a suitable fluid. As described above, both the liquid epoxy resin 13 and the hardener liquid 26 include a solvent to enable them to be delivered via the applicators 28, 28'.

In one example, the applicators 28, 28' may be selected to deliver drops of the liquid epoxy resin 13 and the hardener liquid 26 at a resolution ranging from about 300 dots per inch (DPI) to about 1200 DPI. In other examples, the applicators 28, 28' may be selected to be able to deliver drops of the liquid epoxy resin 13 and the hardener liquid 26 at a higher or lower resolution. The drop velocity may range from about 5 m/s to about 24 m/s and the firing frequency may range from about 1 kHz to about 100 kHz.

Each applicator 28, 28' may include an array of nozzles through which the applicators 28, 28' are able to selectively eject drops of fluid. In one example, each drop may be in the order of about 10 pico liters (pl) per drop, although it is contemplated that a higher or lower drop size may be used. In some examples, applicators 28, 28' are able to deliver variable size drops.

The applicators 28, 28' may be an integral part of the printing system 10", or they may be user replaceable. When the applicators 28, 28' are user replaceable, they may be removably insertable into a suitable distributor receiver or interface module (not shown).

In another example of the printing system 10", a single inkjet printhead may be used to selectively deliver both the liquid epoxy resin 13 and the hardener liquid 26. For example, a first set of printhead nozzles of the printhead may be configured to deliver the liquid epoxy resin 13, and a second set of printhead nozzles of the printhead may be configured to deliver the hardener liquid 26.

As shown in FIG. 3, each of the distributors 28, 28' may have a length that enables it to span the whole width of the support member 40 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 40. In other examples of the printing system 10", the distributors 28, 28' may have a shorter length that does not enable it to span the whole width of the support member 40.

While not shown in FIG. 3, it is to be understood that the distributors 28, 28' may be mounted on a moveable carriage to enable them to move bi-directionally across the length of the support member 40 along the illustrated y-axis. This enables selective delivery of the liquid epoxy resin 13 and/or the hardener liquid 26 across the whole width and length of the support member 40 in a single pass. In other examples, the distributors 28, 28' may be fixed while the support member 40 is configured to move relative thereto.

As used herein, the term 'width' generally denotes the shortest dimension in the plane parallel to the X and Y axes shown in FIG. 3, and the term 'length' denotes the longest dimension in this plane. However, it is to be understood that in other examples the term 'width' may be interchangeable with the term 'length'. As an example, the distributors 28, 28' may have a length that enables them to span the whole length of the support member 40 while the moveable carriage may move bi-directionally across the width of the support member 40.

In examples in which the distributors 28, 28' have a shorter length that does not enable them to span the whole width of the support member 40, the distributors 28, 28' may also be movable bi-directionally across the width of the support member 40 in the illustrated X axis. This configuration enables selective delivery of the liquid epoxy resin 13 and/or the hardener liquid 26 across the whole width and length of the support member 40 using multiple passes.

The distributors 28, 28' may respectively include therein a supply of the liquid epoxy resin 13 and the hardener liquid 26 or may be respectively operatively connected to a separate supply of the liquid epoxy resin 13 and the hardener liquid 26.

As shown in FIG. 3, the printing system 10" also includes a build material distributor 42 and a filler distributor 43. The distributor 42 is used to provide the layer (e.g., layer 14) of the build material 12 on the support member 40. The distributor 43 is used to provide the layer (e.g., layer 15) of the filler 36 on the support member 40. Suitable distributors 42, 43 may include, for example, a sprayer, and extruder, a wiper blade, a roller, or combinations thereof.

The build material 12 and filler build material 36 respectively may be supplied to the build material distributor 42 and the filler distributor 43 from a hopper or other suitable delivery system. In the example shown, the build material distributor 42 and the filler distributor 43 respectively move across the length (Y axis) of the support member 40 to deposit a layer of the build material 12 or the filler build material 36. As previously described, a first layer of build material 12 or filler build material 36 will be deposited on the support member 40, whereas subsequent layers of the build material 12 or filler build material 36 will be deposited on a previously deposited (and solidified) layer (e.g., layer 38, 38').

It is to be further understood that the support member 40 may also be moveable along the Z axis. In an example, the support member 40 is moved in the Z direction such that as new layers of build material 12 or filler 36 are deposited, a predetermined gap is maintained between the surface of the most recently formed layer and the lower surface of the distributors 28, 28'. In other examples, however, the support member 40 may be fixed along the Z axis and the distributors 28, 28' may be movable along the Z axis.

Similar to the system 10 (shown in FIG. 1) and the system 10' (shown in FIG. 2), the system 10" may also include the energy source 34. The energy source 34 may be used to apply energy to the deposited layer of build material 12 and hardener liquid 26 or to the deposited layer of filler 36, liquid epoxy resin 13, and hardener liquid 26 to cause the solidification of portion(s) 30, 30' or to enhance the curing speed. Any of the previously described energy sources 34 may be used. In an example, the energy source 34 is a single energy source that is able to uniformly apply energy to the deposited materials, and in another example, energy source 34 includes an array of energy sources to uniformly apply energy to the deposited materials.

In the examples disclosed herein, the energy source 34 is configured to apply energy in a substantially uniform manner to the whole surface of the deposited build material 12 or the deposited filler 36. This type of energy source 34 may be referred to as an unfocused energy source. Exposing the entire layer to energy simultaneously may help increase the speed at which a three-dimensional object 38, 38' may be generated.

While not shown, it is to be understood that the energy source 34 may be mounted on the moveable carriage or may be in a fixed position.

The central processing unit 46 may control the energy source 34. The amount of energy applied may be in accordance with delivery control data 52.

The system 10" may also include a pre-heater 44 that is used to pre-heat the deposited build material 12 or the deposited filler 36 (as shown and described in reference to FIGS. 1 and 2 at reference numerals 104 and 204). The use of the pre-heater 44 may help reduce the amount of energy that has to be applied by the energy source 34.

To further illustrate the present disclosure, examples are given herein. It is to be understood that these examples are provided for illustrative purposes and are not to be construed as limiting the scope of the present disclosure.

EXAMPLES

Example 1

An example 3D part was printed using examples of the filler, liquid epoxy resin, and hardener liquid disclosed herein. The filler used was AA-18 alumina powder. The liquid epoxy resin included 10 wt % of the epoxy resin, the resin of DURALCO® 4461, dissolved in acetone. The hardener liquid included 21 wt % of the curing agent, the hardener of DURALCO® 4461, dissolved in 20 wt % dimethyl sulfoxide (DMSO) and 59 wt % acetone.

The liquid epoxy resin and the hardener liquid were printed on the filler powder using a thermal inkjet picofluidic system (TIPS) pen. The filler powder with the liquid epoxy resin and the hardener liquid thereon was heated at about 100° C. for about 10 minutes to set/cure/fuse the example 3D part. Heating was accomplished using an IR lamp and a block heater.

The example 3D part was easily removed from the unset/uncured/unfused filler powder using a tweezer.

Example 2

Three different example 3D parts were generated using examples of the filler, liquid epoxy resin, and hardener liquid disclosed herein. The same filler, liquid epoxy resin, and hardener liquid of example 1 were used.

In this example, the liquid epoxy resin and the hardener liquid were mixed with the filler powder manually. In this example, the amount of the liquid epoxy resin was varied so that the different parts were formed with different ratios of epoxy resin to filler build material. The ratio of epoxy resin to filler build material in example part 1 was 75:25. The ratio of epoxy resin to filler build material in example part 2 was 50:50. The ratio of epoxy resin to filler build material in example part 3 was 20:80. For example part 3, additional acetone was added to facilitate substantially uniform mixing of the liquid epoxy resin and the hardener liquid with the filler build material.

Each example was exposed to curing in an oven to form the different parts.

This example demonstrates that various ratios of epoxy resin to filler build material may be used to form 3D parts. While this example did not utilize a 3D printer, since the materials were the same as example 1, it is believed that the same parts can be formed via the 3D printing method disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from greater than 1 µm and up to about 500 µm should be interpreted to include the explicitly recited limits of greater than 1 µm to 500 µm, as well as individual values, such as 50 µm, 125 µm, 300.5 µm, 495 µm, etc., and sub-ranges, such as from about 35 µm to about 375 µm, from about 60 µm to about 225 µm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, consisting of:
applying a build material, the build material including an epoxy resin powder;
selectively applying a hardener liquid consisting of a curing agent and a solvent on at least a portion of the build material, wherein the curing agent chemically reacts with the epoxy resin powder; and
allowing the portion of the build material in contact with the hardener liquid to cure to form a layer of a 3D part;
wherein the hardener liquid further optionally consists of co-solvents, anti-kogation agents, surfactants, diluents, toughening agents, or combinations thereof.

2. The method as defined in claim 1 wherein:
the applying of the build material is accomplished by squeegeeing, spraying, extruding, or dispensing; and
the selectively applying of the hardener liquid is accomplished by thermal inkjet printing or piezoelectric inkjet printing.

3. The method as defined in claim 1 wherein the allowing of the portion of the build material in contact with the hardener liquid to cure includes exposing the build material, including the portion, to energy.

4. The method as defined in claim 3 wherein the exposing of the build material to energy is accomplished by heating the build material to a temperature ranging from about 20° C. to about 200° C. for a time period ranging from about 30 seconds to about 60 minutes.

5. The method as defined in claim 1 wherein:
the hardener liquid includes the curing agent dissolved in the solvent;
the curing agent is an amine, an anhydride, an acid, a phenol, an alcohol, a thiol, an anionic ring opening initiator, or a cationic ring opening initiator; and
the solvent is a ketone, an ester, an acetate, or a sulfoxide.

6. A three-dimensional (3D) printing method, comprising:
applying a build material, the build material including an epoxy resin powder;
selectively applying a hardener liquid including a curing agent on at least a portion of the build material; wherein the curing agent chemically reacts with the epoxy resin powder; and
allowing the portion of the build material in contact with the hardener liquid to cure to form a layer of a 3D part;
wherein the epoxy resin powder is bisphenol-A epoxy resin, bisphenol-F epoxy resin, novolac epoxy resin, aliphatic epoxy resin, or glycidylamine epoxy resin.

7. The method as defined in claim 6 wherein the build material further includes a filler selected from the group consisting of a polymer powder, a ceramic powder, a metal powder, and a carbon black powder.

8. The method as defined in claim 7 wherein a ratio of the epoxy resin powder to the filler ranges from about 90:10 to about 10:90.

9. The method as defined in claim 6 wherein:
the hardener liquid includes the curing agent dissolved in a solvent;
the curing agent is an amine, an anhydride, an acid, a phenol, an alcohol, a thiol, an anionic ring opening initiator, or a cationic ring opening initiator; and
the solvent is a ketone, an ester, an acetate, or a sulfoxide.

10. A three-dimensional (3D) printing method, comprising:
applying a filler build material;
selectively applying a liquid epoxy resin on at least a portion of the filler build material;
selectively applying a hardener liquid including a curing agent on the at least the portion of the filler build material having the liquid epoxy resin applied thereon, wherein the curing agent chemically reacts with the liquid epoxy resin; and
allowing the at least the portion of the filler build material to cure to form a layer of a 3D part.

11. The method as defined in claim 10 wherein:
the liquid epoxy resin includes an epoxy resin dissolved in a solvent;
the epoxy resin is a bisphenol-A epoxy resin, a bisphenol-F epoxy resin, a novolac epoxy resin, an aliphatic epoxy resin, or a glycidylamine epoxy resin; and
the solvent is a ketone, an ester, an acetate, or a sulfoxide.

12. The method as defined in claim 11 wherein a ratio of epoxy resin to filler build material ranges from about 90:10 to about 10:90.

13. The method as defined in claim 10 wherein the filler build material is a ceramic powder, a polymer powder, a metal powder, or a carbon black powder.

14. The method as defined in claim 10 wherein the selectively applying of the liquid epoxy resin and the selectively applying of the hardener liquid are accomplished by thermal inkjet printing or piezoelectric inkjet printing.

15. The method as defined in claim 10 wherein the allowing of the portion of the filler build material in contact with the hardener liquid to cure includes exposing the filler build material, including the portion, to energy, and wherein the energy exposure is accomplished by heating the filler build material to a temperature ranging from about 20° C. to about 200° C. for a time period ranging from about 30 seconds to about 60 minutes.

16. The method as defined in claim 10 wherein:
the hardener liquid includes the curing agent dissolved in a solvent;
the curing agent is an amine, an anhydride, an acid, a phenol, an alcohol, a thiol, an anionic ring opening initiator, or a cationic ring opening initiator; and
the solvent is a ketone, an ester, an acetate, or a sulfoxide.

17. The method as defined in claim 10 wherein the filler build material consists of a ceramic powder or a metal powder and further optionally consists of a flow aid.

18. The method as defined in claim 17 wherein the filler build material is the ceramic powder and wherein the ceramic powder is selected from the group consisting of alumina, soda-lime glass, silicon carbide, silicon nitride, silicon dioxide, zirconia, titanium dioxide, iron oxide, hafnia, barium titanate, tungsten carbide, lead zirconate titanate, hydroxyapatite, and combinations thereof.

19. The method as defined in claim 18 wherein the ceramic powder is alumina or silicon dioxide.

* * * * *